Patented Feb. 5, 1929.

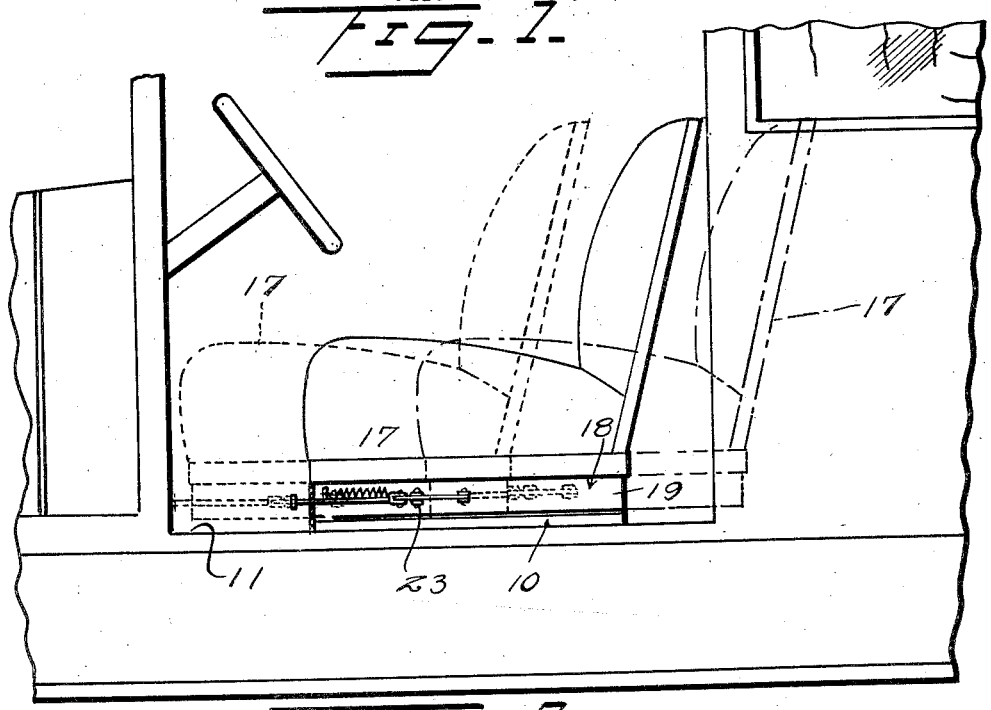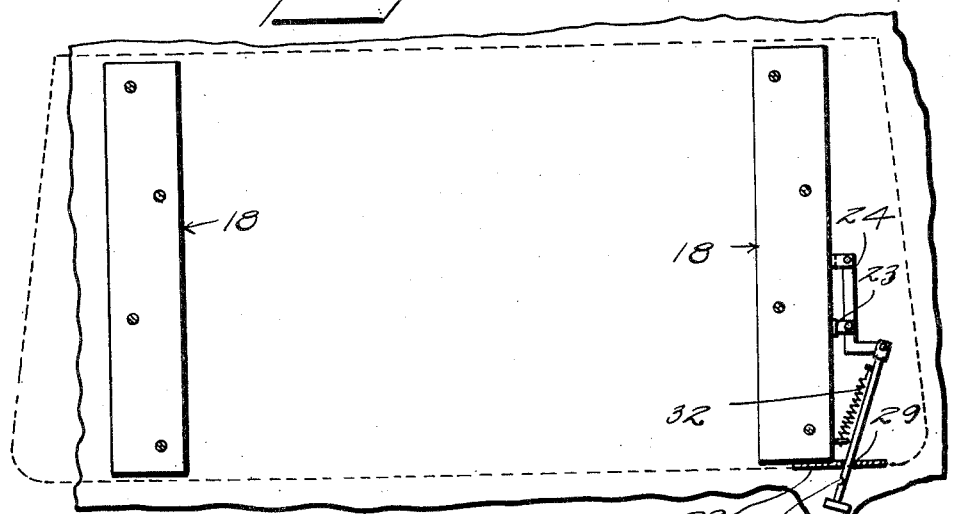

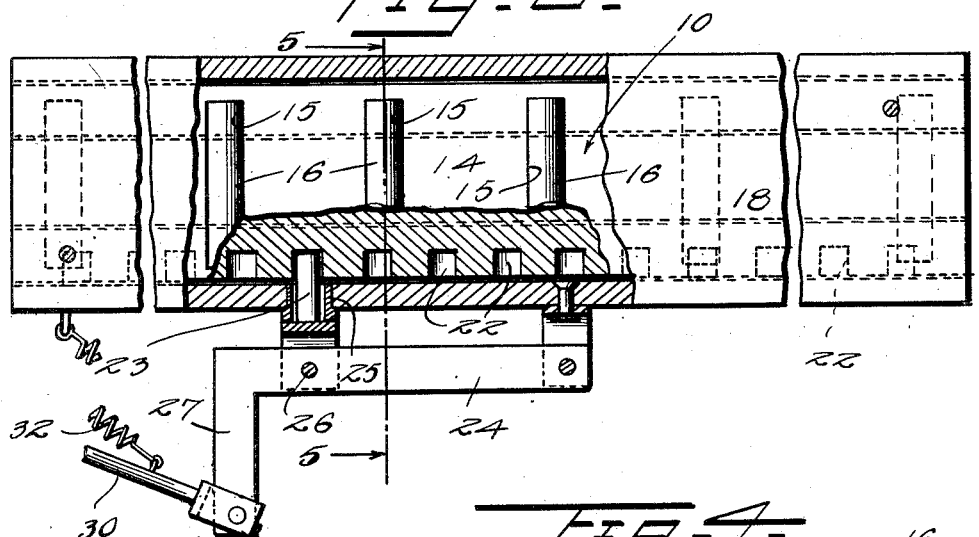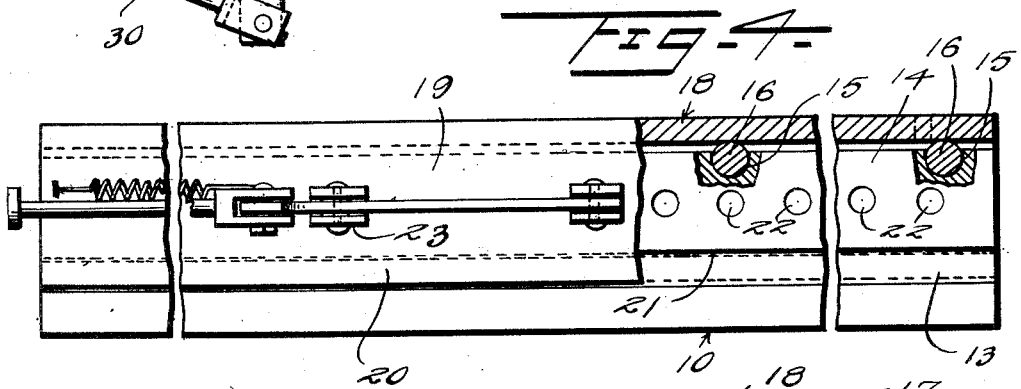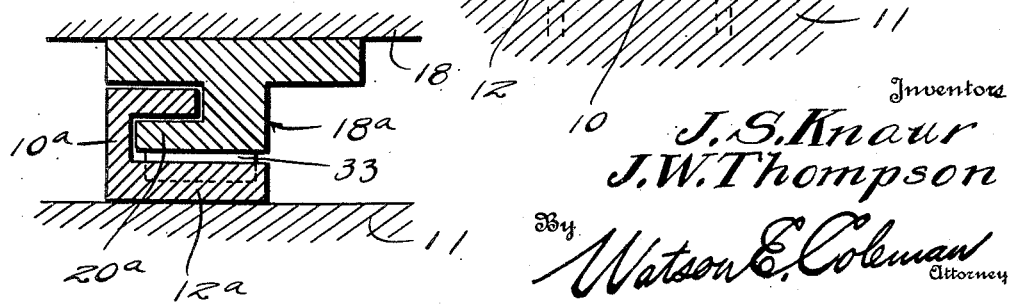

1,701,044

UNITED STATES PATENT OFFICE.

JOHN SHERMAN KNAUR AND JAMES WILLIAM THOMPSON, OF LONGVIEW, WASHINGTON; SAID THOMPSON ASSIGNOR TO SAID KNAUR.

VEHICLE SEAT.

Application filed March 26, 1927. Serial No. 178,749.

This invention relates to vehicle seats and more particularly to an automobile seat capable of general use, but particularly adapted for use with closed vehicles, in which the front seat usually obstructs the entrance.

An important object of the invention is to provide a seat mounting upon which the seat may be slid either forwardly or rearwardly to permit entrance to either the rear seat or the front seat as may be desired.

A further object of the invention is to provide a device of this character which will permit adjustment of the front seat in such manner that the controls of the vehicle may be properly spaced from the seat.

A further object of the invention is to produce a device of this character which may be very readily applied to the vehicle, which will be neat in appearance and which will be durable and efficient in service.

These and other objects we attain by the construction shown in the accompanying drawings, wherein for the purpose of illustration is shown a preferred embodiment of our invention and wherein:—

Figure 1 is a side elevation showing a seat constructed in accordance with our invention applied to the vehicle, the seat being illustrated in solid lines in its normal position, in dotted lines as adjusted forwardly and in construction lines as adjusted rearwardly;

Figure 2 is a plan view of the seat supports, the seat being indicated in dotted lines;

Figure 3 is an enlarged plan view partially in section illustrating the latching mechanism;

Figure 4 is an enlarged side elevation partially in section;

Figure 5 is a section on the line 5—5 of Figure 3;

Figure 6 is a section similar to that shown in Figure 5, but illustrating a slightly modified form of seat support.

Referring now more particularly to the drawings, the seat supports comprise parallel rails 10, which may be either secured directly to the deck 11 of the vehicle, or arranged within grooves formed therein. The rail preferably comprises a base portion 12, which is secured to the deck, a reduced neck 13 and a head 14, which extends to opposite sides of the neck and overlies the base 12. The upper surface of the head is provided at spaced intervals with sockets 15 within which are arranged rollers 16 extending transversely of the head. A rail 10 is arranged adjacent each end of the seat.

Attached to the under surface of the seat 17, adjacent opposite ends thereof, are slides 18, each embodying downwardly extending arms 19, which engage opposite sides of the head and have at their lower ends inturned flanges 20, which extend into the slots 21 formed between the lower faces of the projecting portions of the head and the base. A slide 18 rests upon the rollers 16 and is guided thereby. The slide 18 is practically of the same length as the depth of the seat, as will be obvious from an inspection of either of Figures 1 or 2.

The head 14 of one of the rails has formed in the side face thereof a plurality of longitudinally spaced socket openings 22 adapted to interchangeably receive a latch 23. This latch is preferably located at a point where it may be conveniently operated by the occupant of the driver's seat. In the present instance, the operating mechanism for the latch comprises a lever 24 pivoted at its rear end to the arm 19 of the slide through which the opening 25 is formed, for the passage of the latch 23. The latch 23 is pivoted to this lever adjacent the forward or free end thereof at 26 and the forward end of the lever has an angular extension 27 projecting outwardly from the slide. Secured to the forward end of the slide is a plate 28 having an opening 29 formed therein. Pivoted to the end of the angular extension 27 is an operating handle 30 which, adjacent its forward end, passes through the plate and is provided with a notch 31 aligning with the plate and in which the plate is engageable when the operating rod is moved rearwardly a sufficient distance to cause disengagement of the latch 23 from the openings. A spring 32 connected between the slide and this rod constantly urges the notched face of the rod toward the opposed side of the opening 29 and also urges this rod longitudinally to a position where the latch 23 will be engaged in one of the openings. When it is desired to free the seat for movement, the rod 31 is forced rearwardly until the plate is engaged in the notch 31. The seat is then adjusted and to lock it in position, it is simply necessary to strike the outer or forward end of the rod with sufficient force to cause the notch to disengage from the plate 28, when the rod will be moved outwardly by the spring to cause the latch 23 to seat in the next opening, with which it aligns.

As more clearly shown in Figure 6, it is not necessary that the rollers be placed between the head of the rail and the slide, nor is it necessary that the slide completely embrace the head of the rail. The structure illustrated in this figure shows a rail 10ª similar to the structure which would be produced if the rail 20 were cut longitudinally in a vertical plane. The slide 18ª similarly resembles the slide 18. The rollers 33, however, are socketed into the base 12ª and engage the under surface of the angular portion 20ª of the slide 18.

Other changes being possible in the construction hereinbefore set forth without materially departing from the spirit of the invention, we do not limit ourselves to such structure except as hereinafter claimed.

We claim:—

In a slidable connection between a vehicle seat and the deck upon which it is mounted, spaced parallel rails underlying and of substantially equal length as the seat, each of said rails embodying a deck-engaging base, a neck arising therefrom and a head, some portion of which overlies the base, spaced slides secured to the seat bottom and engaging said rails, said head having its upper surface provided with a plurality of grooves, a plurality of rollers positioned in said grooves, and projecting above the upper surfaces of said heads for engagement with the under faces of said slides to carry the load directly on the center of each roller to permit an even distribution of weight without binding, the entire load being carried on the rollers and necks, said slides each having a depending arm provided at its lower end with an inturned flange entering the space between the head and base of the rail, the rail having in a side face thereof a series of longitudinally spaced openings, the slide having an opening alignable with any of the openings of the rail, a latch projectible through said opening, a lever pivoted to the outer face of the rail and to which said latch is pivotally connected, said lever at its forward end having an angular extension, an operating rod pivotally connected at its rear end to the outer end of the angular extension and a spring constantly urging said rod in a direction projecting the latch through said opening, the forward end of said rod projecting through an opening formed in the plate, the rod having a notch formed in its side face engageable with the plate at the opening when the rod is positioned to disengage the latch from the openings of the rail.

In testimony whereof we hereunto affix our signatures.

JOHN SHERMAN KNAUR.
JAMES WILLIAM THOMPSON.